United States Patent
Harter, Jr.

(10) Patent No.: US 7,148,482 B2
(45) Date of Patent: Dec. 12, 2006

(54) MULTIPLE SENSOR THERMAL RADIATION DETECTOR AND METHOD

(75) Inventor: Joseph E. Harter, Jr., Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 249 days.

(21) Appl. No.: 10/808,835

(22) Filed: Mar. 25, 2004

(65) Prior Publication Data

US 2005/0211903 A1 Sep. 29, 2005

(51) Int. Cl.
*G01J 5/02* (2006.01)

(52) U.S. Cl. .................. 250/353; 250/DIG. 1

(58) Field of Classification Search ........... 250/353, 250/DIG. 1
See application file for complete search history.

(56) References Cited

U.S. PATENT DOCUMENTS

| 4,321,594 A | * | 3/1982 | Galvin et al. ............... 340/567 |
| 5,668,539 A | | 9/1997 | Patchell ....................... 340/903 |
| 5,886,821 A | | 3/1999 | Sohn | |
| 6,470,273 B1 | | 10/2002 | Halsted et al. ............... 701/301 |
| 6,753,766 B1 | * | 6/2004 | Patchell ....................... 340/436 |
| 2001/0045520 A1 | * | 11/2001 | Asano et al. ................. 250/342 |
| 2002/0126002 A1 | | 9/2002 | Patchell ....................... 340/436 |

FOREIGN PATENT DOCUMENTS

GB 2322442 A 8/1998

OTHER PUBLICATIONS

European Search Report dated Dec. 6, 2005. Not a Publication.

* cited by examiner

*Primary Examiner*—Constantine Hannaher
(74) *Attorney, Agent, or Firm*—Jimmy L. Funke

(57) ABSTRACT

A thermal radiation detector for detecting thermal energy in multiple coverage zones is provided. The detector includes a heat sink support structure, a first thermal detection sensor coupled to the support structure and arranged to detect thermal energy in a first coverage zone, and a second thermal detection sensor coupled to the support structure for detecting thermal energy in a second coverage zone. The detector also has a shared optical lens coupled to the support structure and arranged to direct thermal energy from the first coverage zone to the first thermal detection sensor, and to direct thermal energy from the second coverage zone to the second thermal detection sensor. The detector is useful to detect heat emitting objects in a blind spot region of a vehicle.

8 Claims, 3 Drawing Sheets

MULTIPLE SENSOR THERMAL RADIATION DETECTOR AND METHOD

TECHNICAL FIELD

The present invention generally relates to sensors and, more particularly, to the detection of thermal radiation emission, such as thermal energy emitted from an object in a host vehicle blind spot region.

BACKGROUND OF THE INVENTION

Automotive vehicles are increasingly being equipped with collision warning systems that warn the driver of the vehicle of objects that pose a potential obstruction to the vehicle. Collision warning systems typically include one or more sensors, such as radar sensors and cameras, for sensing the presence of an object in a coverage zone, usually forward or rearward of the host vehicle. While vehicles are typically equipped with side view mirrors for viewing a portion of the side of the host vehicle, it should be appreciated that many vehicles may exhibit an unviewable area which is commonly referred to as a blind spot region. In addition to sensing objects forward and rearward of the vehicle, it is also desirable to sense objects that may be located proximate the side of the host vehicle, particularly in the blind spot region, to warn the driver of any potential obstructions, especially when changing lanes.

A number of detection systems have been proposed for detecting objects in a vehicle blind spot region. Many of the proposed detection systems employ various types of sensors for detecting an object and alerting the driver of the host vehicle of the presence of the object in the blind spot region. One example of a detection system for detecting objects emitting thermal radiation in a blind spot of a vehicle is disclosed in U.S. Pat. No. 6,961,006 and entitled "OBJECT DETECTION FOR A STOPPED VEHICLE," the entire disclosure of which is hereby incorporated herein by reference. The aforementioned detection approach employs a single thermal detection sensor detecting thermal radiation emitted in a single coverage zone, and detects the presence of an object emitting thermal radiation based on a detected temperature variation when the vehicle is stopped.

Another example of a proposed detection system for detecting objects in a blind spot of a vehicle is disclosed in U.S. Pat. No. 5,668,539 and U.S. Pat. No. 6,753,766, both of which are hereby incorporated herein by reference. The approaches disclosed in the aforementioned patent documents generally employ a plurality of infrared sensors, such as thermopile sensors, to detect changes in a thermal scene along the side of a host vehicle to detect the presence of a thermal emitting object, such as another automobile, in the blind spot region of the host vehicle. These prior techniques employ identical sensors positioned at predetermined locations along the side of the host vehicle, such that the forward-most first sensor is aimed in a particular direction to receive a thermal image from a specific area, and a second sensor is located further aft on the host vehicle and is positioned to generally view the same area, some predetermined time period after the first sensor as the host vehicle moves forward. By knowing speed of the host vehicle, a microcontroller determines the amount of time shift that is necessary to have data from the same physical area at two different points in time. If there is a temperature increase in the second thermal image, then it is assumed to be the heat emitted from a vehicle. The heat could be heat reflected from the road underneath the vehicle or heat generated at the interface of the road and tires of the vehicle.

The thermal radiation detectors disclosed in some conventional detection systems employ multiple thermal detection sensors each having a separate lens element for receiving and detecting thermal energy in a coverage zone. Some techniques employ a thermal detection sensor and a shutter for switching between multiple coverage zones. While these approaches are capable of detecting thermal radiation present in multiple coverage zones, such approaches are often large in size, complex, and expensive. Additionally, some conventional sensing approaches suffer from variations in temperature that exist in the separate lenses and/or an uncontrolled temperature environment of the thermal detection sensors.

It is therefore desirable to provide for a cost-effective and compact thermal radiation detector for detecting thermal radiation in multiple coverage zones. It is further desirable to provide for a multiple zone thermal detection detector that minimizes temperature variations and stray infrared energy to provide a controlled temperature sensing environment.

SUMMARY OF THE INVENTION

In accordance with the teachings of the present invention, a thermal radiation detector is provided for detecting thermal energy in multiple coverage zones. According to one aspect of the present invention, the detector includes a support structure, a first thermal detection sensor coupled to the support structure and arranged to detect thermal energy in a first coverage zone, and a second thermal detection sensor coupled to the support structure for detecting thermal energy in a second coverage zone. The detector also includes an optical lens coupled to the support structure and arranged to direct thermal energy from the first coverage zone to the first thermal detection sensor, and to direct thermal energy from the second coverage zone to the second thermal detection sensor.

According to another aspect of the present invention, a method of detecting thermal radiation in multiple coverage zones is provided. The method includes the step of providing a thermal detector having first and second detection sensors and an optical lens for directing thermal energy from first and second coverage zones to the first and second thermal detection sensors. The method also includes the step of detecting a first temperature in a first coverage zone with the first thermal detection sensor, wherein thermal energy passes through the optical lens to the first thermal detection sensor. The method further includes the step of detecting a second temperature in a second coverage zone, wherein thermal energy passes through the optical lens to the second thermal detection sensor.

Accordingly, the thermal radiation detector and method of the present invention advantageously detects thermal radiation emissions from within multiple coverage zones by employing a compact and cost-affordable detector having multiple thermal sensors and a shared single lens element. The thermal detection detector and method is particularly useful for detecting thermal radiating objects in a blind spot region of a host vehicle.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
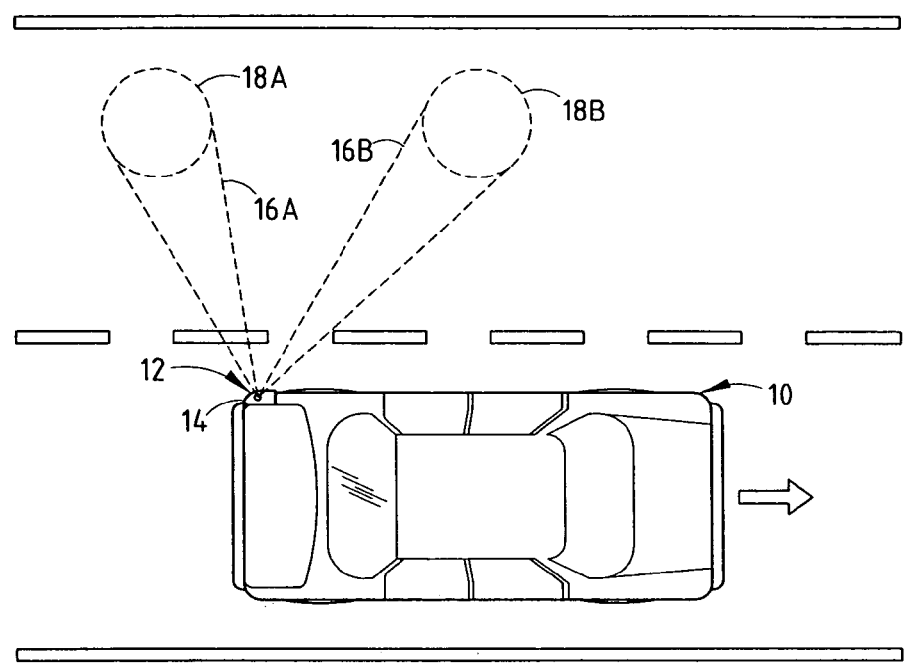
FIG. 1 is a top view of a host vehicle equipped with an object detection system employing a thermal radiation detector according to the present invention.

Referring to FIG. 1, a host vehicle 10, such as an automobile, is generally illustrated equipped with an object detection system employing a multiple sensor, thermal radiation detector 12 according to the present invention. The thermal detector 12 is shown mounted on the host vehicle 10 and configured to cover multiple coverage zones each having a field of view, such as first and second coverage zones 16A and 16B, respectively. In the embodiment shown and described herein, the multiple sensor, thermal detector 12 is located within the rear tail lamp assembly 14 of the host vehicle 10. However, it should be appreciated that the thermal detector 12 may be located at various other locations onboard the host vehicle 10 to sense thermal energy (temperature) in each of coverage zones 16A and 16B. For example, the thermal detector 12 could be located in a side body panel or an exterior rearview mirror housing on the host vehicle 10.

While the multiple sensor, thermal detector 12 is shown and described herein in connection with use on a host vehicle 10 for detecting objects emitting thermal radiation in a blind spot region of the host vehicle 10, it should be appreciated that the thermal detector 12 may be employed in various other applications for detecting thermal radiation emitted from multiple coverage zones, without departing from the spirit of the present invention. For example, it is contemplated that the thermal detector 12 may be employed to detect the presence or motion of a person or animal passing through the coverage zones.

The first and second coverage zones 16A and 16B extend onto corresponding target areas 18A and 18B, respectively, of the ground surface, such as the roadway, in the embodiment shown. It should be appreciated that the thermal detector 12 detects thermal energy (heat) by detecting temperature in each of the coverage zones 16A and 16B including the corresponding target areas 18A and 18B, respectively. Thermal energy may be generated and emitted by another vehicle, according to one example, and may include thermal energy generated by the engine of the other vehicle which may be reflected toward the roadway, and thermal energy generated at the tire/road interface of the other vehicle. Thermal energy could also be emitted from a person or other heat-emitting object(s). In the embodiment shown, the thermal detector 12 senses thermal energy temperatures in coverage zones 16A and 16B directed toward the side of the host vehicle 10 which includes a typical blind spot region of the host vehicle 10.

Figure 2:
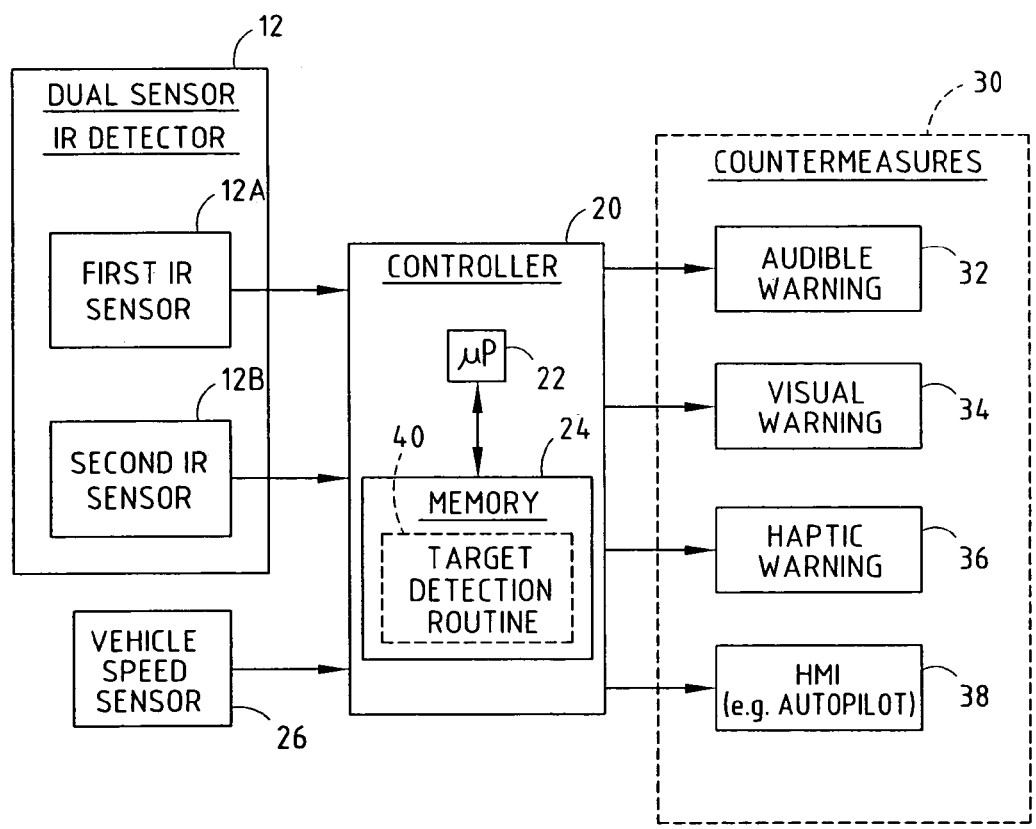
FIG. 2 is a block diagram illustrating the object detection system of FIG. 1.

Referring to FIG. 2, the object detection system is generally shown including the multiple sensor, thermal detector 12 having a first infrared (IR) sensor 12A and a second infrared (IR) sensor 12B. Each of the first and second infrared sensors 12A and 12B may include any of a number of known sensors for detecting thermal energy in a coverage zone. According to one embodiment, the thermal detection sensors 12A and 12B may each include an infrared (IR) sensor employing a thermopile sensor for sensing temperature within a coverage zone. One example of a commercially available thermal detector is the MLX90601 infrared thermometer module, which is commercially available from Melexis Microelectronics Integrated Systems. More specifically, each of the thermal infrared sensors 12A and 12B may include Model No. MLX90601EZA-CAA, commercially available from Melexis Microelectronics Integrated Systems. The aforementioned infrared thermometer module employs a thermopile sensor as the infrared sensing element for recording remote temperature measurements and provides signal conditioning, linearization, and ambient temperature compensation.

The object detection system also includes a controller 20 for processing signal outputs from both of the first and second infrared sensors 12A and 12B, in addition to processing other signals including a speed signal from vehicle speed sensor 26. The controller 20 may include a controller dedicated to thermal detection processing and/or target detection, or may include a shared controller, such as a body controller of the host vehicle 10, according to one example. The controller 20 includes a microprocessor 22 and memory 24. The microprocessor 22 may include a conventional microprocessor having the capability for processing algorithms and data. Memory 24 may includes read-only memory (ROM), random access memory (RAM), flash memory, and other commercially available volatile and non-volatile memory devices. Stored within memory 24 and processed by microprocessor 22 is target detection routine(s) 40 for detecting one or more objects emitting thermal radiation and initiating one or more countermeasures.

The controller 20 monitors the sensed temperature in each of the multiple coverage zones 16A and 16B sensed by thermal detection sensors 12A and 12B and determines the presence and amount of thermal radiation, such as heat emitted from object(s) in each of the coverage zones. This may include detecting a change in monitored temperature between the coverage zones 16A and 16B. The controller 20 may process the temperatures sensed via sensors 12A and 12B to determine the presence of an object emitting thermal radiation in a blind spot region of the vehicle as described in U.S. Pat. No. 6,753,766, which is incorporated herein by reference.

Upon detecting the presence of an object in the blind spot region of the vehicle, the controller 20 may initiate one or more countermeasures 30. The countermeasures 30 may include any of a number of known countermeasures for warning the driver of the host vehicle 10 or providing control functions such as collision avoidance. According to the embodiment shown, the countermeasures 30 include an audible warning 32, a visual warning 34, a haptic warning 36, and a human machine interface (HMI) 38. The audible warning 32 may include an audio alert sound or a message transmitted from an audio transmitter, such as an audio speaker. The visual warning 34 may include any of a number of illuminated warnings such as one or more indicator lights and/or messages which may be presented to the driver via LEDs and/or displays. Haptic warning 36 may include actively vibrating the driver's seat or other haptic warning functions. The HMI 38 may include generating a collision avoidance signal and/or any of a number of interfaces including an autopilot having collision avoidance capability according to one example.

Figure 3:
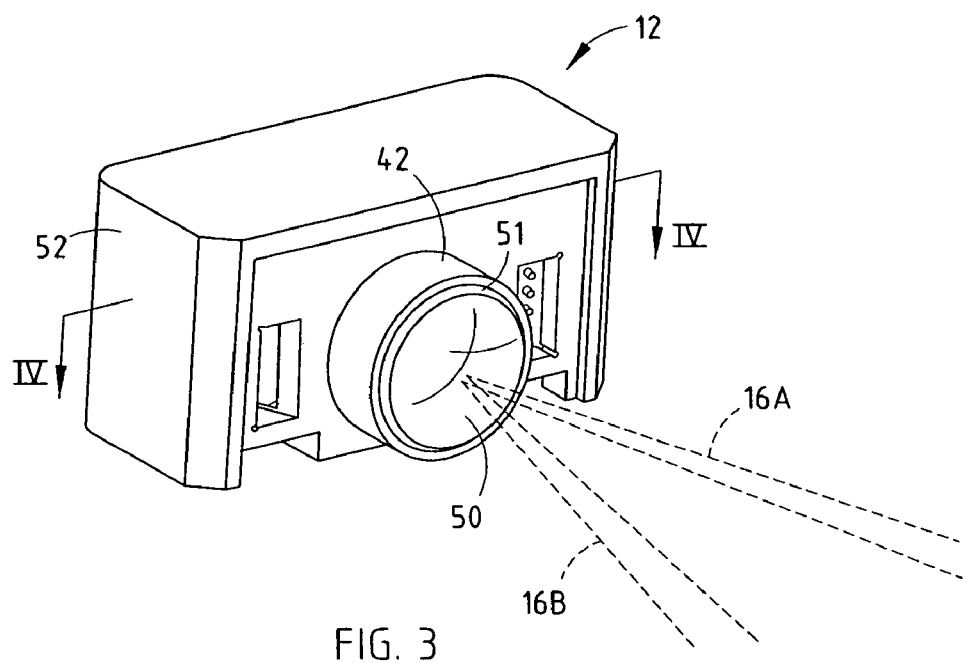
FIG. 3 is a perspective view of the thermal radiation detector employed in the detection system according to the present invention.
Figure 4:
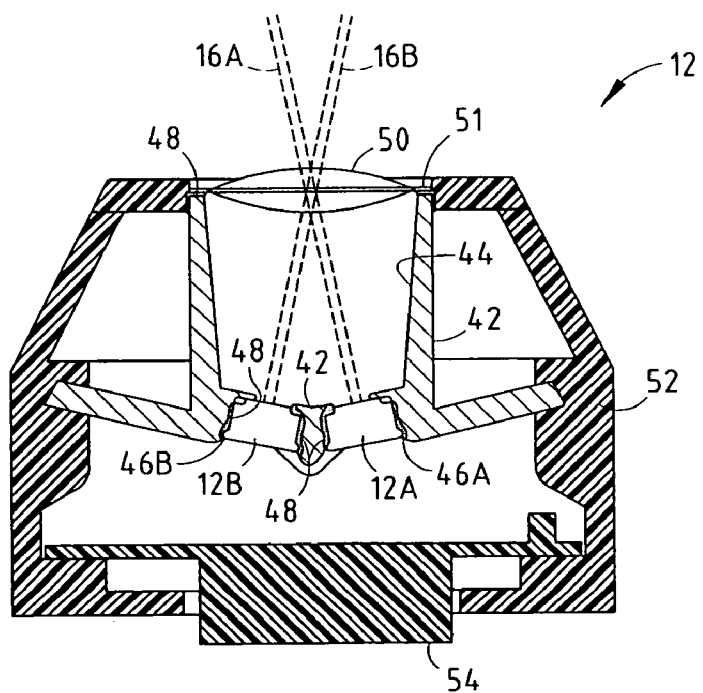
FIG. 4 is a cross-sectional view of a thermal radiation detector taken through lines IV—IV of FIG. 3.
Figure 5:
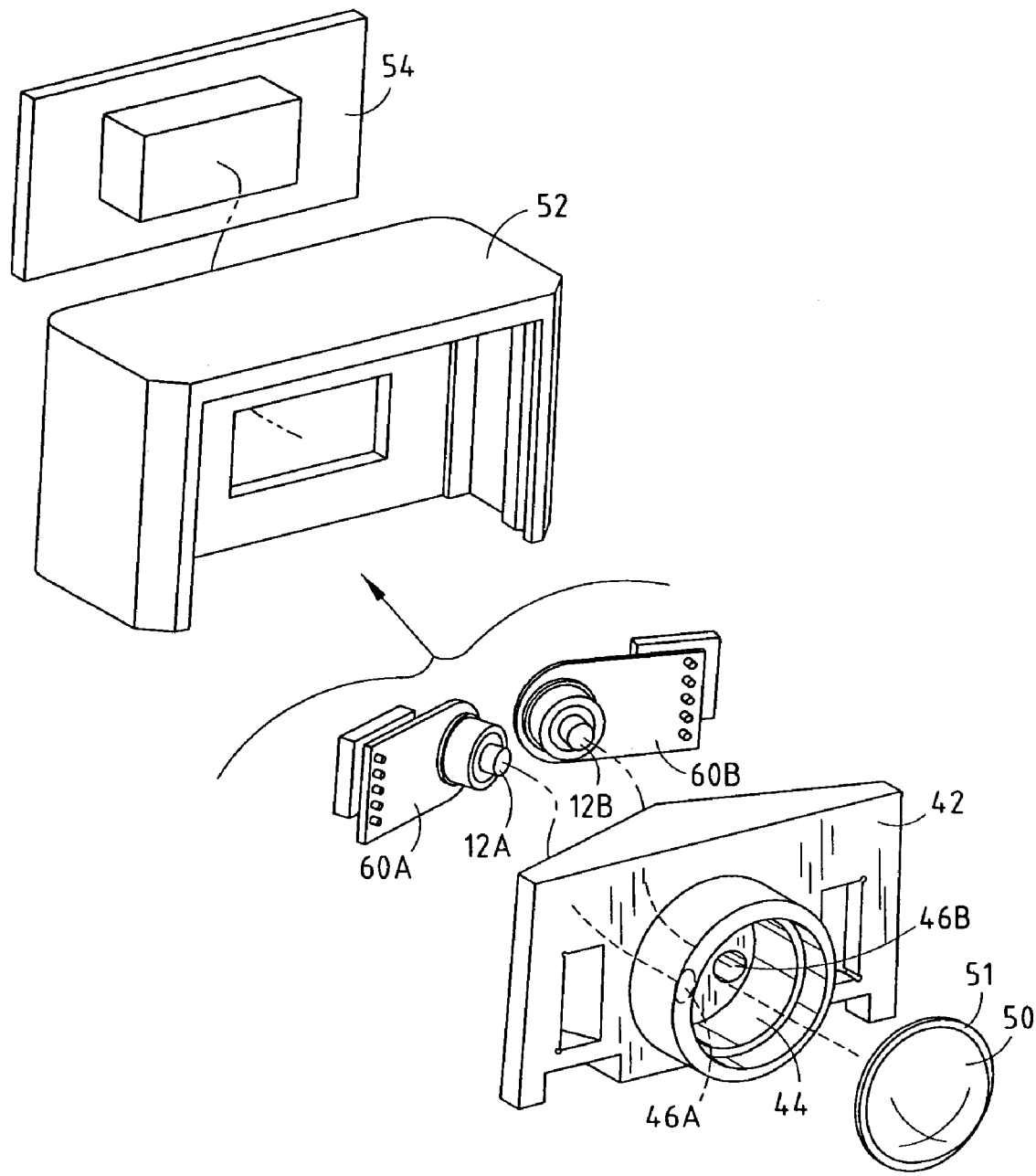
FIG. 5 is an exploded view of the thermal radiation detector shown in FIG. 3.

The multiple sensor, thermal detector 12 according to the present invention is illustrated in detail in FIGS. 3–5. In the embodiment shown, the thermal detector 12 includes first and second thermal detection sensors 12A and 12B coupled to a support structure 42 in the form of a conductive heat sink. The thermal detection sensors 12A and 12B are arranged to receive infrared thermal radiation emitted from within corresponding coverage zones 16A and 16B extending through a shared single element optical lens 50. The thermal detection sensors 12A and 12B detect infrared thermal radiation generally in the wavelength range of between 8 to 14 microns on the electromagnetic spectrum, according to one example.

Each of the first and second infrared thermal sensors 12A and 12B are mounted on a board 60A and 60B, respectively, and includes electrical circuitry for powering the sensor and for generating a signal indicative of the thermal energy detected by the corresponding sensor. The electrical circuitry may be coupled to a vehicle bus or other power and data communication paths.

Sensors 12A and 12B are mounted in openings 46A and 46B, respectively, formed in heat sink support structure 42. Sensors 12A and 12B are inserted in openings 46A and 46B, and are adhered to heat sink 42 via a thermally conductive adhesive 48. Examples of thermally conductive adhesive 48 include 4173 and 4174 adhesives commercially available from The Dow Chemical Company. The thermally conductive adhesive 48 distributes ambient thermal energy (heat) between each of sensors 12A and 12B and heat sink 42.

The single element optical lens 50 is an optical lens that focuses and directs the thermal energy from coverage zones 16A and 16B onto respective sensors 12A and 12B. The optical lens 50 shown has a shaped surface and a peripheral rim 51. Optical lens 50 may include any of a number of available optical lenses for directing infrared radiation to the sensors. For example, optical lens 50 may include a glass molded infrared lens, a ground germanium infrared lens, or a plastic polymeric infrared lens. More specifically, optical lens 50 may include a Fresnel molded lens or an aspheric or spherical reflective lens.

The single element optical lens 50 is thermally and adhesively coupled to the heat sink 42. According to the embodiment shown, the optical lens 50 fits into an opening in heat sink 42 and the rim 51 of lens 50 is adhered to heat sink 42 via a thermally conductive adhesive 48, such as the type described above. The heat sink 42 provides an inner support structure for supporting infrared sensors 12A and 12B and optical lens 50 and distributes heat therebetween.

The heat sink 42 is made of a thermally conductive material, such as aluminium, which serves to uniformly distribute thermal energy (heat) around and between infrared sensors 12A and 12B and optical lens 50. By uniformly distributing heat, the thermal radiation detection realized by first and second thermal sensors 12A and 12B minimizes temperature variations that may otherwise occur within the thermal detector 12.

The heat sink 42 has inner walls 44 that define a chamber through which received thermal energy from the first and second coverage zones 16A and 16B passes through optical lens 50 to the respective first and second thermal sensors 12A and 12B. The inner walls 44 of the heat sink 42 are coated with an infrared absorbing material, such as a carbon black paint. By employing an infrared absorbing material on the inner walls of the chamber, stray infrared radiation is absorbed by the inner walls 44 of the heat sink 42, such that stray infrared radiation does not inject noise into the thermal detection sensors 12A and/or 12B.

The multiple sensor, thermal detector 12 is further shown having a non-conductive polymeric outer cover 52, which substantially encloses the heat sink 42, optical lens 50, and thermal sensors 12A and 12B. The outer cover 52 houses the aforementioned components and includes a mounting structure 54 which allows for easy mounting of the thermal detector 12 onto another structure, such as the interior wall of a rear lamp assembly on a vehicle.

While the multiple sensor, thermal detector 12 has been shown and described herein in connection with detecting thermal energy emitted from first and second coverage zones 16A and 16B in a blind spot region of a vehicle 10, it should be appreciated that the thermal detector 12 may be employed for any of a number of applications for detecting thermal radiation in first and second coverage zones.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A detector for detecting thermal radiation in multiple coverage zones, said detector comprising:
   a support member;
   a first thermal detection sensor supported on and thermally coupled to the support member and arranged to detect thermal energy in a first coverage zone;
   a second thermal detection sensor supported on and thermally coupled to the support member for detecting thermal energy in a second coverage zone; and
   a single optical lens supported on and thermally coupled to the support member and arranged to direct thermal energy from the first coverage zone to the first thermal detection sensor, and to direct thermal energy from the second coverage zone to the second thermal detection sensor, wherein the support member comprises a metallic heat sink maintaining the optical lens and the first and second thermal detection sensors at a substantially common temperature.

2. The detector as defined in claim 1, wherein each of the first and second thermal detection sensors comprises an infrared sensor.

3. The detector as defined in claim 2, wherein the infrared sensor comprises a thermopile sensor.

4. The detector as defined in claim 1, wherein the first and second thermal detection sensors are coupled to the heat sink via a thermally conductive adhesive.

5. The detector as defined in claim 1, wherein the support member comprises interior walls extending from the first and second thermal detection sensors to the optical lens and defining a chamber, wherein the interior walls comprise an infrared absorbing material.

6. The detector as defined in claim 1, wherein the detector is located on a vehicle.

7. The detector as defined in claim 6, wherein the detector is located on the vehicle to detect one or more objects in a blind spot region of the vehicle.

8. The detector as defined in claim 1 wherein the support member comprises aluminum.

* * * * *